(12) United States Patent
Carlsson et al.

(10) Patent No.: US 6,619,460 B1
(45) Date of Patent: Sep. 16, 2003

(54) BRAKING ARRANGEMENT AND BRAKING MANEUVER MEANS

(75) Inventors: Sven-Åke Carlsson, Eskilstuna (SE); Bo Vigholm, Eskilstuna (SE)

(73) Assignee: Volvo Wheel Loaders AB, Eskilstuna (SE)

( * ) Notice: Subject to any disclaimer, the term of this patent is extended or adjusted under 35 U.S.C. 154(b) by 0 days.

(21) Appl. No.: 09/711,668

(22) Filed: Nov. 13, 2000

Related U.S. Application Data

(63) Continuation of application No. PCT/SE99/00797, filed on May 11, 1999.

(30) Foreign Application Priority Data

May 13, 1998 (SE) ................................................ 9801672

(51) Int. Cl.⁷ ........................... B60T 1/06; B60T 13/22; F16D 59/02; F16H 57/10; F16H 57/12
(52) U.S. Cl. ..................... 192/219.5; 188/31; 188/69; 188/265; 74/411.5; 192/220.2
(58) Field of Search .............................. 188/31, 69, 265, 188/60, 71.5; 192/219.5, 220.4, 220.2; 74/411.5, 577 R, 577 S

(56) References Cited

U.S. PATENT DOCUMENTS

| | | | |
|---|---|---|---|
| 5,696,679 A | * 12/1997 | Marshall et al. | ........... 74/411.5 |
| 5,704,457 A | * 1/1998 | Kimura et al. | |
| 5,879,111 A | 3/1999 | Stock et al. | |
| 5,964,335 A | 10/1999 | Taniguchi et al. | |
| 6,199,442 B1 | * 3/2001 | Bauer et al. | ................... 188/31 |

FOREIGN PATENT DOCUMENTS

| | | |
|---|---|---|
| EP | 0 841 126 A2 | 5/1998 |
| EP | 0 891 902 A1 | 1/1999 |
| WO | WO 93/09981 A1 | 5/1993 |
| WO | WO 97/25231 A1 | 7/1997 |

* cited by examiner

Primary Examiner—Douglas C. Butler
(74) Attorney, Agent, or Firm—Howrey, Simon, Arnold & White LLP

(57) ABSTRACT

A brake arrangement for a machine that includes a locking element adapted to engage with an output shaft from a gearbox. The gearbox comprising at least two gearwheels utilized to obtain different gears. A gear clutch is provided for each gearwheel and is adapted to engage and disengage a respective gearwheel depending on the operating conditions of the machine. A control unit is arranged to control the gear clutches so that the gear clutches simultaneously engage at least two of the gearwheels thus to braking the output shaft. The control unit is adapted to control the locking element so that the locking element engages with the output shaft when the output shaft is at a standstill thereby causing the output shaft to be prevented from rotating when the locking element engages with the output shaft.

8 Claims, 3 Drawing Sheets

BRAKING ARRANGEMENT AND BRAKING MANEUVER MEANS

RELATED PATENT APPLICATIONS

This is a continuation patent application of International Application No. PCT/SE99/00797 filed May 11, 1999 and published in English pursuant to PCT Article 21 (2), and which claims priority to Swedish Application No. 9801672-8, filed May 13, 1998, the applications are expressly incorporated herein by reference in their entireties.

TECHNICAL FIELD

The present invention relates generally to a brake arrangement and brake-operating assembly. More specifically, the invention relates to brake arrangements for machines, such a wheeled loaders, dumpers and the like, are used to brake the movement of the machine and to prevent the machine from moving from a standstill.

BACKGROUND OF THE INVENTION

Brake arrangements of the type generally referred to above may take the form of a parking brake. Some machines, such as wheeled loaders and dumpers, are provided with two brake pedals for this function which are positioned in such a manner in a driver's cab of the machine that the driver can use either the right foot or the left foot to brake the machine. It is previously known to configure such a brake arrangement in the form of a multiplate clutch on the output transmission shaft of a wheeled loader. The multiplate clutch functions as a parking brake and comprises a number of plates surrounded by a fluid present in the multiplate brake. When the parking brake is activated, the plates bear against discs in the multiplate brake so that the plates, and thus the output transmission shaft, are secured utilizing friction. When the parking brake is deactivated, the plates are not in contact with the discs in the multiplate brake, but instead rotate freely in the surrounding fluid. It has been found, however, that the viscous losses in such known brake arrangements are considerable when the parking brake is deactivated and the vehicle is driven forwards. These losses lead to increased fuel consumption by the machine. The viscous losses occur when the plates rotate in the surrounding fluid.

It is also previously known to provide a mechanical connection between two brake pedals of a wheeled loader in the form of a connecting shaft. The first brake pedal is connected to a valve which is arranged to control the flow of hydraulic fluid from a pressure source to brake cylinders of the machine. When the second brake pedal is pressed down, the valve connected to the first pedal will be acted on by virtue of the fact that the connecting shaft between the brake pedals ensures that the first brake pedal is also pressed down. A disadvantage of this known brake-operating assembly is that the connecting rod occupies otherwise usable space on the floor of the driver's cab.

In view of the above described deficiencies associated with conventionally designed braking arrangements, the present invention has been developed. These enhancements and benefits are described in greater detail hereinbelow with respect to several alternative embodiments of the present invention.

SUMMARY OF THE INVENTION

The present invention in its several disclosed embodiments alleviates the drawbacks described above with respect to conventionally designed braking arrangements and incorporates several additional beneficial features.

One object of the present invention is to produce a brake arrangement which is essentially loss-free when the brake arrangement is activated. That is, such a brake arrangement results in imperceptible losses because the locking element engages with the output shaft only when the machine is at a standstill and there is no contact between these components when the output shaft is rotating. The result is that the locking element does not cause any power losses during operation of the machine. By simultaneously engaging the gear clutches for the respective gear steps braking of the vehicle can be brought about by means of the brake arrangement. The brake arrangement can thus be used as a parking brake which is activated when the machine is driving along or at a standstill.

Another object of the present invention is to produce a brake-operating assembly which eliminates a mechanical connection between two brake pedals and thus affords a greater amount of free floor space in the driver's cab. Among other things, this increases the mobility of the driver and thus affords the driver greater comfort. The brake-operating assembly according to the present invention also affords a simpler construction and thus easier mounting in the machine. The brake-operating assembly also leads to greater safety because a valve element is arranged at each brake pedal.

BRIEF DESCRIPTION OF THE DRAWINGS

The invention will now be described in greater detail in the following way, by example only, and with reference to the attached drawings, in which.

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
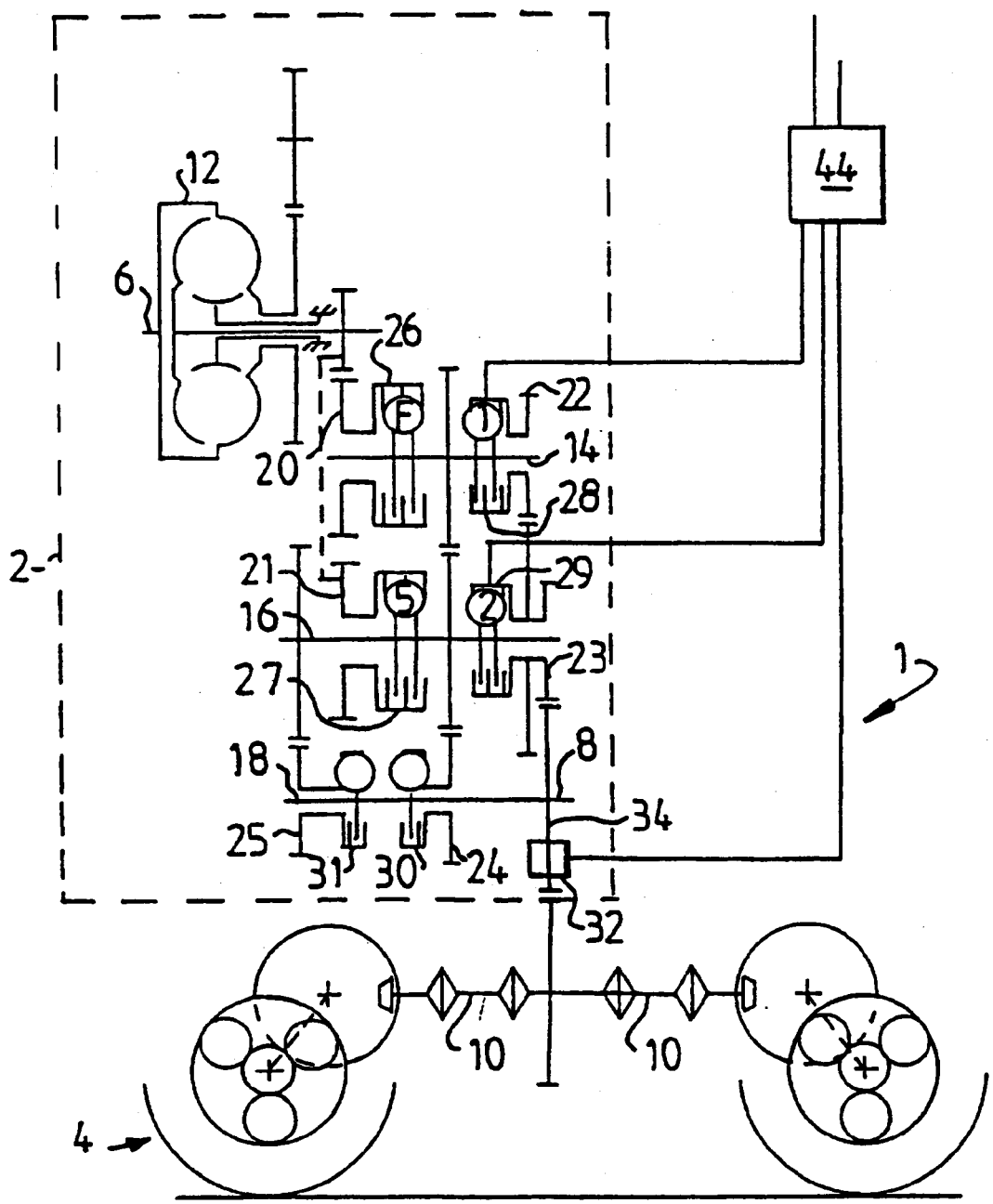
FIG. 1 is a diagrammatic, partly sectioned view of the transmission of a machine with a brake arrangement according to the present invention.

FIG. 1 shows an exemplary embodiment of a brake arrangement 1 according to the present invention. The brake arrangement 1 is arranged in the gearbox 2 of a machine 4, such as a wheeled loader, dumper or similar contractor's machine. The gearbox 2 is of a known design often characterized as a power shift type which, as in the illustrated exemplary embodiment, comprises an input shaft 6 from an engine (not shown) and an output shaft 8 which is connected to the drive shafts 10 of the machine. A torque converter 12 is arranged on the input shaft 6. Arranged in the gearbox 2 are a first, a second and a third shaft 14, 16 and 18 respectively which each bear a number of gearwheels 20–25 which are mounted on the respective shafts 14, 16 and 18.

The output shaft 8 is connected to the third shaft 18. To connect the gearwheels 20–25 to the shafts 14, 16 and 18, a gear clutch 26–30 is provided for each gearwheel 20–25. The gearbox 2, as shown, has four gear steps which are indicated by the encircled numbers 1–4 of FIG. 1. The gearwheels 26 and 27 are intended for forward and reverse gear, which gears are indicated by the letters F and B in FIG. 1. To change the gear in the gearbox 2, one of the gearwheels 20–25 is engaged by means of its associated gear clutch 26–30 at the same time as another gearwheel is disengaged by means of its associated gear clutch. The way in which the gear changing takes place in such a power shift gearbox is generally known by those skilled in the art and are therefore not described in greater detail.

Figure 2:
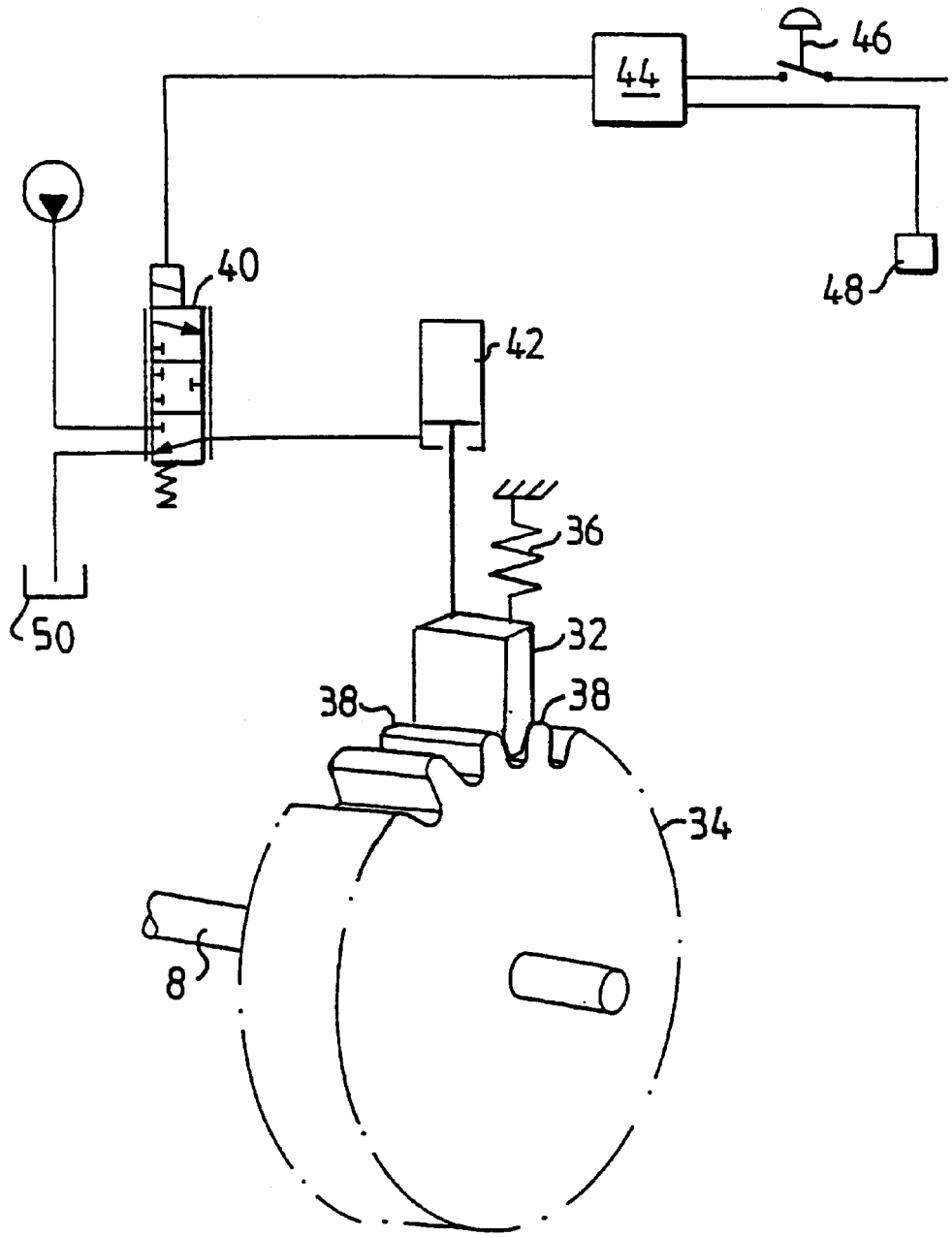
FIG. 2 is a diagrammatic perspective view of a locking element according to the present invention.

The brake arrangement 1 comprises a locking element 32 which is adapted to engage with a gearwheel 34 arranged on the output shaft 8. FIG. 2 shows diagrammatically how seen such locking element 32 can be designed. In that Figure, the locking element 32 has assumed a locked position, a pressure spring 36 having inserted the locking element 32 between two teeth 38 of the gearwheel 34. In this locked position, the output shaft 8 from the gearbox 2 is prevented from rotating which means that the machine 4 cannot move. The locking element 32 functions as a parking brake and is intended to engage in the gearwheel 34 when the machine 4 has stopped and is at a standstill. The parking brake can, however, be activated while the machine is moving. To free the locking element 32 and thus release the parking brake, an actuator valve 40 is activated which allows hydraulic fluid to pass to a cylinder 42 which brings the locking element 32 out of engagement with the gearwheel 34.

A control unit 44 connected to the actuator valve 40 receives signals in a first instance from a parking brakeoperating means 46, such as a push-button or a lever, and in a second instance from a sensor 48 which measures the speed of the machine 4. The locking element 32 can be activated by the parking brake-operating means 46 when the machine 4 is driving along. When the machine 4 has subsequently stopped and the sensor 48 sends signals to the control unit 44 that the speed is zero, the cylinder 42 will be emptied by the valve 40 and thereby assume the configuration shown in FIG. 2. The pressure spring 36 then inserts the locking element 32 between the teeth 38 of the gearwheel 34 so that the locking element 32 bears against the flanks of the teeth 38.

In the event that the brake arrangement 1 is activated using the parking brake-operating means 46 when the machine 4 is driving along, as intimated to and described above, the speed of the machine 4 must thus be braked down to zero in order for the locking element 32 to be capable of engaging in the gearwheel 34. This braking is brought about by the control unit 44 sending signals to two different gear clutches 26–31 in the gearbox 2 causing the output shaft 8 from the gearbox 2 to be braked. The gear clutches 26–31 consist of multiplate clutches; this means that the braking of the output shaft 8 takes place proportionally to the pressure applied to the plates. The control unit 44 is thus connected to the gear clutches 26–31 as shown in FIG. 1. Only two gear clutches 26–31 are connected to the control unit 44 in FIG. 1, but it is of course possible for all the gear clutches 26–31 to be connected to the control unit 44.

If the parking brake-operating means or operator 46 is activated when the machine 4 is driving along, the control unit 44 will thus receive information that the machine 4 is driving along. The control unit 44 then activates two gear clutches 26–31 in the gearbox 2, for example the gear clutches 28, 29 for first and second gear, after which the machine 4 will be braked. The control unit 44 subsequently receives information that the machine 4 is at a standstill, after which the locking element 32 can be activated by the control unit 44.

The actuator valve 40 is electrically controlled and spring-loaded so that the actuator valve 40 takes up the position shown in FIG. 2 when the power supply to the actuator valve 40 ceases. In this position, the cylinder 42 is drained of hydraulic fluid to a tank 50. As the pressure spring 36 acts with a pressing force on the locking element 32, the pressure spring 36 will guide the locking element 32 in the direction towards the gearwheel 34 when the cylinder 42 is drained. The locking element 32 will thus engage in the gearwheel 34 when the power supply to the actuator valve 40 ceases. The locking element 32 is designed in such a manner that it will bounce on the teeth 38 if the force acting against the spring 36 disappears when the output shaft 8 is rotating, a condition which can occur if no power is being supplied to the actuator valve 40.

The functioning of the actuator valve 40 means that the element 32 always engages in the output shaft 8 when the machine 4 is at a standstill and the engine is switched off, irrespective of whether the parking brake-operating means 46 is activated or not.

If a neutral gear position is selected, that is to say no gear in the gearbox 2 is engaged or activated, and the parking brake-operating means 46 is not activated, the control unit 44 will send signals to the gear clutches 26–31 when the machine has stopped. In this way the gearwheels 20–25, of which the gear clutches 26–31 are applied, brake and secure the machine 4.

When the engine of the machine 4 is started, two gear clutches 26–31 will always be activated in order to secure the machine 4, irrespective of the position of a gear lever (not shown) for the gearbox 2. In order to activate the gear clutches 26–31 and also the locking element 32 and thus allow the machine 4 to be capable of driving along, the gear lever must be shifted into a neutral position.

In order to tow the machine 4, the locking element 32 and the gear clutches 26–31 must be released. If the engine is switched on, there is a bridging function in the electrical system of the machine 4 which provides a completely disengaged transmission. In the event of power loss or when the engine is switched off, it is possible to release the locking element 32 mechanically by means of an adjusting screw on the outside of the gearbox 2.

Above, a locking element 32 has been described which engages in a gearwheel 34 arranged on the output shaft 8. However, it is also possible to provide a locking element 32. which engages directly with the output shaft 8, such as a dry friction multiplate clutch or a Jaw clutch (not shown).

Figure 3:
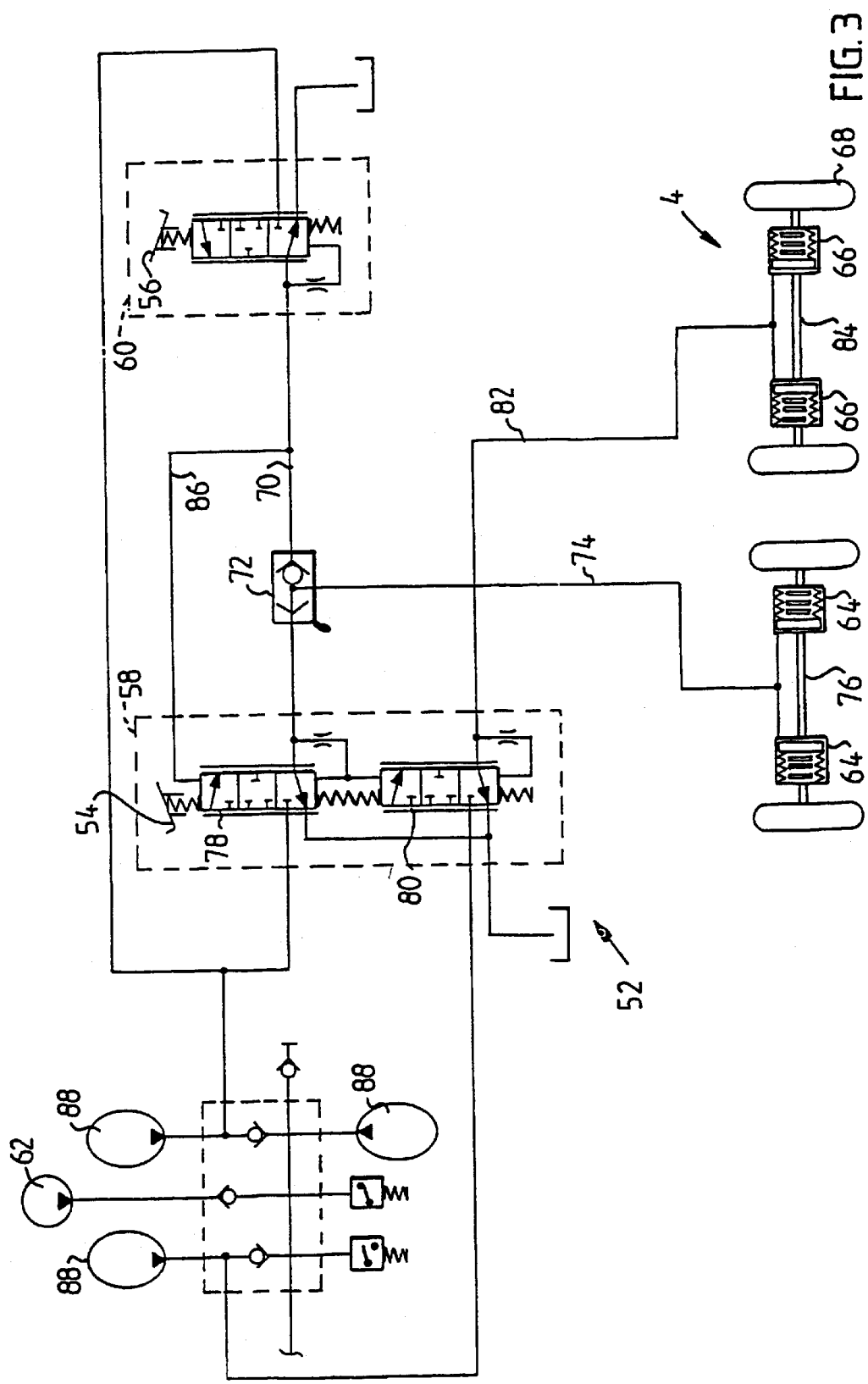
FIG. 3 is a diagrammatic of a brake-operating assembly according to the present invention.

FIG. 3 shows a brake-operating assembly 52 for a machine 4, such as a wheeled loader, dumper or similar contractor's machine. The brake-operating assembly 52 comprises a first and a second brake pedal 54 and, respectively, 56. A first valve element 58 is connected to the first brake pedal 54 and a second valve element 60 is connected to the second brake pedal 56. The first and second valve elements 58 and 60 are arranged so as to control the flow of hydraulic fluid from a pressure source 62 to brake cylinders 64 and 66 which are arranged at the wheels 68 of the machine 4 in order to brake the machine 4. Arranged between the first and the second brake pedals 54 and 56 is a connection which includes a connecting line 70 for conducting hydraulic fluid and which is arranged between the first valve element 58 and the second valve element 60.

A shuttle valve 72 is arranged in the connecting line 70. The shuttle valve 72 closes the connection between the second valve element 60 and the brake cylinders 64 when the first valve element 58 is activated by the first brake pedal 54. When the second valve element 60 is activated by the second brake pedal 56, the shuttle valve 72 closes the connection between the first valve element 58 and the brake cylinders 64.

According to the exemplary embodiment shown in FIG. 3, the shuttle valve 72 is arranged in a first brake line 74 which is connected to the brake cylinders 64 which are located on a first wheel axle 76 of the machine 4. The first wheel axle 76 may be a rear axle of the machine 4.

The first valve element 58 comprises first and second slide valves 78, 80, respectively, which are arranged in such a manner that the first slide valve 78 controls the second slide valve 80 when the first slide valve 78 is activated by the first brake pedal 54. As shown in FIG. 3, this control can be mechanical.

The first slide valve 78 is connected to the shuttle valve 72 and the second slide valve 80 is connected via a brake line 82 to the brake cylinders 66 which are located on a second wheel axle 84 of the machine 4. The second wheel axle 84 may be a front axle of the machine 4.

A pilot line 86 for hydraulic fluid is arranged between the first and the second valve element 58 and 60, so that, when the second valve element 60 is activated by the second brake pedal 56, the first valve element 60 will be activated by the hydraulic fluid in the pilot line 86.

The brake pedals 54 and 56 are preferably positioned next to one another on the floor in a driver's cab (not shown) of the machine 4. The connecting line 70, the shuttle valve 72 and the pilot line 86 are then positioned under the floor so that a free space is formed on the floor between the brake pedals 54 and 56. The brake-operating assembly 52 according to the invention is redundant, that is to say, if one valve element 58 or 60 breaks down, the machine 4 can still be braked by the second valve element 58 or 60. If the pressure source 62 should break down, accumulators 88 are provided, which contain hydraulic fluid under pressure. By means of the accumulators 88, the machine 4 can be braked in spite of the fact that the pressure source is non-functional.

An arrangement and method of utilization for a braking maneuvering means has been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A brake arrangement for a machine, said arrangement comprising a locking element which is adapted to engage with an output shaft from a gearbox, which gearbox comprises at least two gearwheels in order to obtain different gears and a gear clutch for each gearwheel and adapted to engage and disengage the respective gearwheel depending on the operating conditions of the machine, characterized in that a control unit is arranged so as to control the gear clutches so that they simultaneously engage at least two of the gearwheels so as thus to brake the output shaft, and in that the control unit is arranged so as to control the locking element so that the locking element engages with the output shaft when the output shaft is at a standstill, the result of which is that the output shaft is prevented from rotating when the locking element engages with the output shaft.

2. The brake arrangement as recited in claim 1, wherein the locking element is spring-loaded by means of a spring so as to engage with the output shaft, and in that a means is adapted to counteract the spring so as to bring the locking element out of engagement with the output shaft.

3. The brake arrangement as recited in claim 2, wherein said means is a cylinder which is controlled by an actuator valve.

4. The brake arrangement as recited in claim 1, wherein the locking element is adapted to engage positively between at least two teeth of a gearwheel arranged on the output shaft.

5. A brake arrangement for a machine, said arrangement comprising:

a locking element adapted to engage with an output shaft from a gearbox, said gearbox comprising at least two gearwheels utilized to obtain different gears;

a gear clutch for each gearwheel, each of said gear clutches being adapted to engage and disengage a respective gearwheel depending on the operating conditions of the machine; and a control unit arranged to control the gear clutches so that the gear clutches simultaneously engage at least two of the gearwheels thus braking the output shaft, said control unit being adapted to control the locking element so that the locking element engages with the output shaft when the output shaft is at a standstill causing the output shaft to thereby be prevented from rotating when the locking element engages with the output shaft.

6. The brake arrangement as recited in claim 5, further comprising said locking element being spring-loaded for biased engagement with the output shaft; and a biasing assembly adapted to counteract the spring-loaded biased engagement disengaging the locking element from engagement with the output shaft.

7. The brake arrangement as recited in claim 6, wherein said biasing assembly is a cylinder which is controlled by an actuator valve.

8. The brake arrangement as recited in claim 5, wherein the locking element is adapted to positively engage between at least two teeth of a gearwheel arranged on the output shaft.

* * * * *